United States Patent [19]

Jekel

[11] Patent Number: 4,498,257

[45] Date of Patent: Feb. 12, 1985

[54] FISHING ROD BUTT

[76] Inventor: Harold L. Jekel, Rte. 5097, Corning, Calif. 96021

[21] Appl. No.: 496,909

[22] Filed: May 23, 1983

[51] Int. Cl.³ .............................................. A01K 87/02
[52] U.S. Cl. ......................................... 43/23; 43/21.2
[58] Field of Search ...................................... 43/21–2, 43/23, 15, 16, 17, 25; 248/520, 528, 530, 535, 538; 224/922

[56] References Cited

U.S. PATENT DOCUMENTS

| | | | |
|---|---|---|---|
| 2,000,263 | 5/1935 | Feetor | 43/23 |
| 2,539,080 | 1/1951 | Hoover | 43/23 |
| 3,159,939 | 12/1964 | Tronsean | 43/21.2 |
| 3,287,844 | 11/1966 | Hoxter | 43/21.2 |
| 3,924,345 | 12/1975 | Sapp | 43/21.2 |

Primary Examiner—Nicholas P. Godici
Assistant Examiner—M. Jordan
Attorney, Agent, or Firm—Leonard D. Schappert

[57] ABSTRACT

A fishing rod butt which fits onto the end of a fishing rod and which has a pivoting body support opposite the fishing rod which pivots so that, when the fishing rod butt is held against the body of the fisherman, as during game fishing, the pressure of the fishing rod butt, which would normally be felt over a very small (approximately one and one-half square inch) area of the abdomen, is effectively spread over a larger area of the fisherman's abdomen, thus affording comfort during fishing. Included are three unique mechanisms for locking the pivoting body support of the fishing rod butt in position with respect to the main butt structure.

3 Claims, 8 Drawing Figures

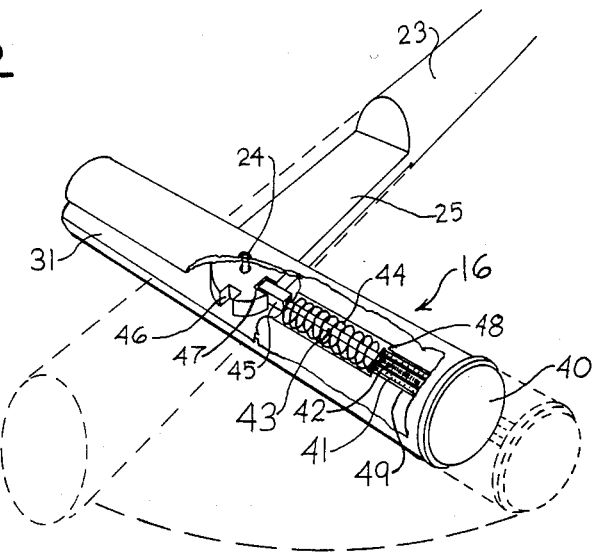
FIG. 6
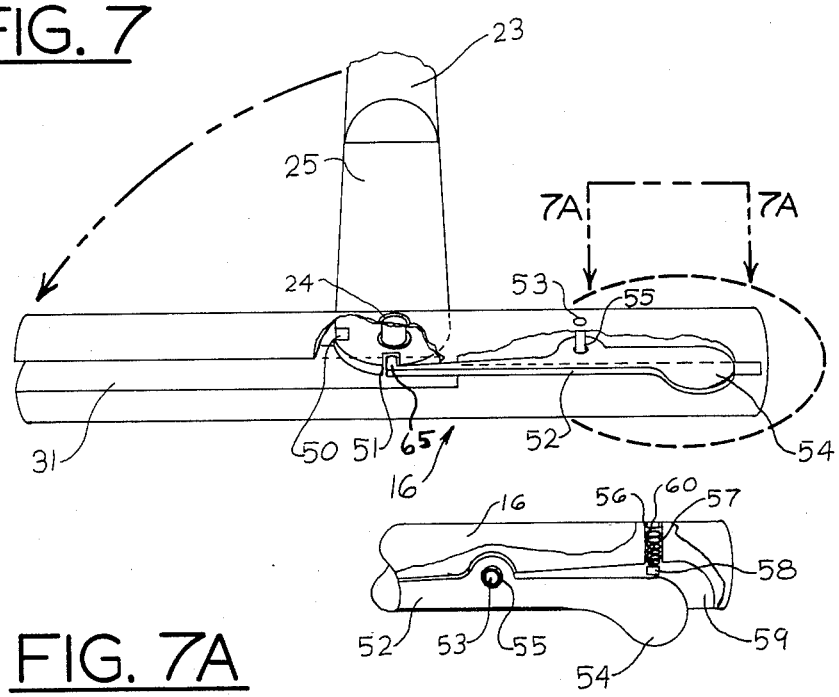
FIG. 7
FIG. 7A

FISHING ROD BUTT

BACKGROUND OF THE INVENTION

1. Field of the Invention

This invention relates generally to the field of sporting goods, more specifically to devices for use in fishing, and particularly to an unique fishing rod butt designed primarily for use in large-game fishing.

2. Description of the Prior Art

In the past, inventors have directed their efforts toward designing and building special handles which fit on fishing rod butts and facilitate holding the fishing rod during fishing. Other inventors have made fishing pole holders which pierced the ground or some other surface and held the fishing pole in place while unattended. Still other inventors have directed their efforts toward fishing rod supports designed to equalize the pressure of the fishing rod butt across a large area of the abdomen during game fishing when the fishing rod was held tightly against the fisherman for leverage. The present invention is of the type designed to equalize pressure over a larger area of the abdomen during game fishing. However, none of the prior art of which applicant is aware has taught the unique structure and features taught by the present invention.

SUMMARY OF THE INVENTION

The present invention consists of a fishing rod butt which fits onto the end of a fishing rod and which has a pivoting body support opposite the fishing rod which pivots so that, when the fishing rod butt is held against the body of the fisherman, as during game fishing, the pressure of the fishing rod butt, which would normally be felt over a very small (approximately one and one-half square inch) area of the abdomen, is effectively spread over a larger area of the fisherman's abdomen. Included in the invention are three unique mechanisms for locking the pivoting body support of the fishing rod butt in position with respect to the main butt structure.

One of the objects of the present invention is to provide a fishing rod butt which distributes pressure of the fishing rod over a relatively large area of the body of the fisherman, thereby affording more comfort during fishing.

Another object of the present invention is to provide a fishing rod butt having a pivoting body support which, when locked in an open position and held against the body of the fisherman, provides a pivoting action, thereby increasing the comfort of the fisherman.

Another object of the present invention is to provide a fishing rod butt having a pivoting body support which, when locked in an open position and held under the fisherman's forearm, greatly increases the leverage obtained with that arm, thus reducing pressure on the wrist in the handling of larger fish.

A further object of the present invention is to provide a fishing rod butt which has a pivoting body support and which, when inserted into a rod holder and locked in an open position, affords positive locking, thus preventing the loss of tackle from the majority of rod holders in use on boats.

The foregoing objects, as well as other objects and benefits, will become more apparent in a reading of the description and claims which follow.

DESCRIPTION OF THE DRAWINGS

FIG. 6 is a perspective view showing an alternative locking mechanism for use in locking the pivoting body support with respect to the main butt structure.

FIG. 7 is a perspective view showing a second alternative locking mechanism for use in locking the pivoting body support with respect to the main butt structure.

FIG. 7A is a cutaway view taken along lines 7A—7A of FIG. 7 and showing more clearly the structure of the locking mechanism used in FIG. 7.

DESCRIPTION OF THE PREFERRED EMBODIMENT

Figure 1:
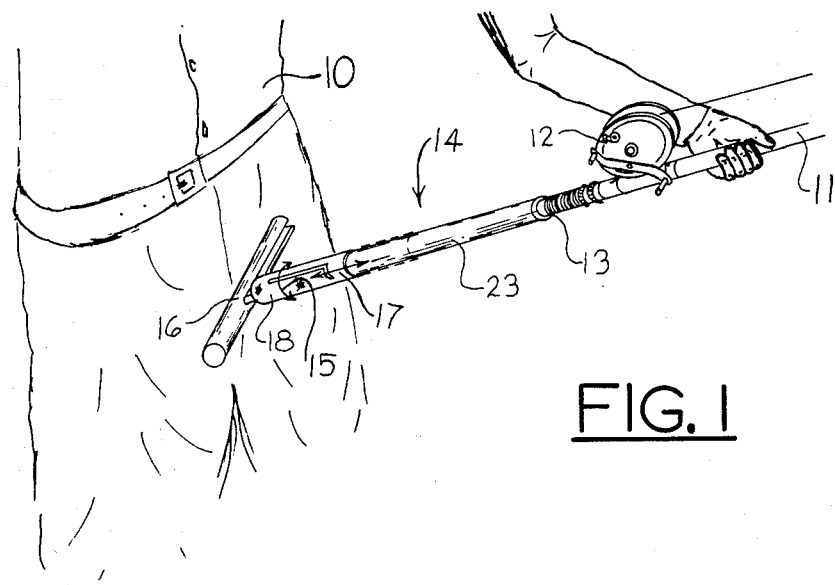
FIG. 1 is a perspective view showing the fishing rod butt in place on a fishing rod and in use by a fisherman.
Figure 2:
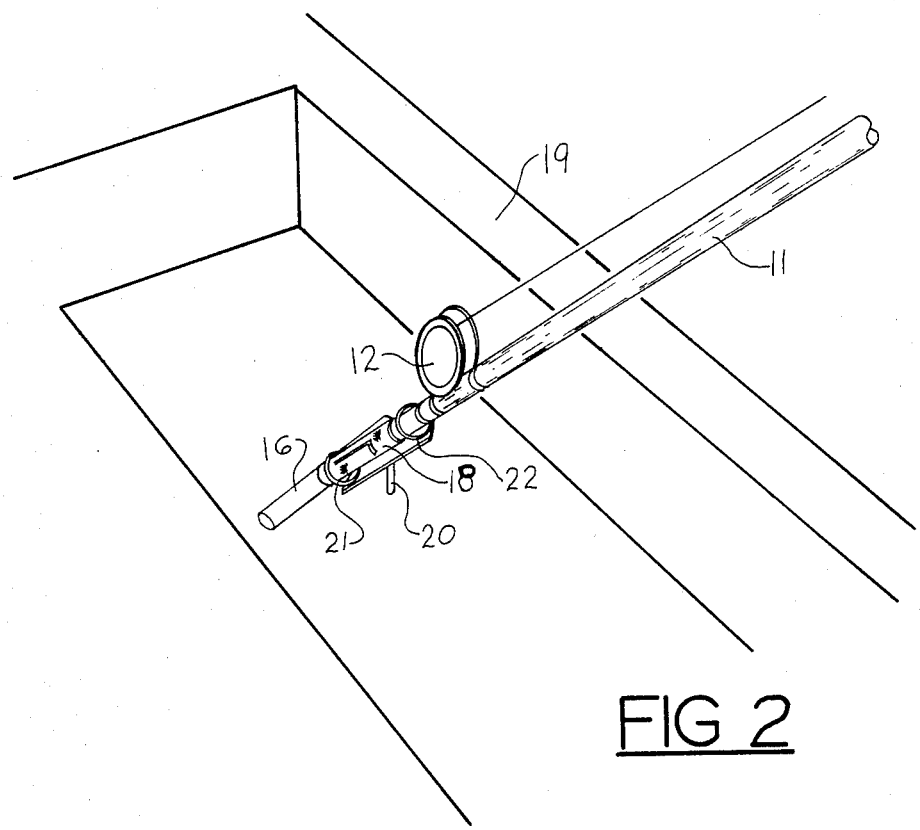
FIG. 2 is a perspective view showing the fishing rod butt attached to a fishing rod and in use in a fishing rod holder on a boat.
Figure 4:
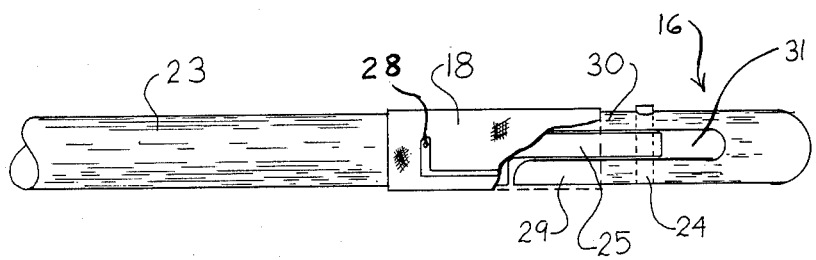
FIG. 4 is a side view with appropriate cutaways showing the construction of the fishing rod butt.
Figure 5:
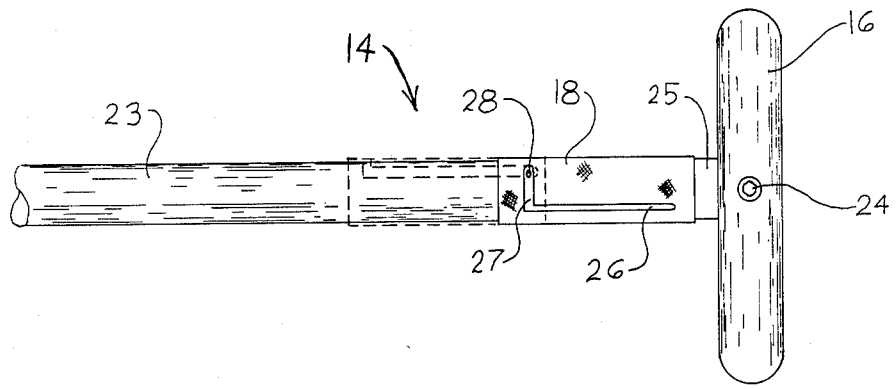
FIG. 5 is a side view showing the fishing rod butt with the pivoting body support locked in an open position, and further showing the locking mechanism.

The present invention consists of a fishing rod butt (14) which is constructed generally of wood or metal. The invention as shown in FIGS. 1 and 2 of the drawings consists of a main butt structure (23) and a pivoting body support (16) with a locking sleeve (18), which slides as shown by line (17) and turns as shown by line (15), on main butt structure (23), and which is used to lock the pivoting body support (16) in place. Sleeve (18) may be used to lock pivoting body support (16) in place in direct line with main butt structure (23) as shown in FIG. 4, or at 90 degrees to main butt structure (23) as shown in FIG. 5 of the drawings. Fishing rod (11) with reel (12) attached is secured to main butt structure (23) by being placed in hole (13) and glued in place. While glue was used in the present embodiment, the fishing rod (11) could be pinned or attached by any other effective and acceptable method.

FIG. 1 of the drawings shows the complete fishing rod (11) and fishing rod butt (14) in use by a fisherman (10), and shows the placement of pivoting body support (16) against the abdomen of the fisherman (10) while he is fighting a large fish. As can be seen, pivoting body support (16) distributes the pressure normally present at the tip of a rod butt over a large area of the abdomen of fisherman (10), thereby making him more comfortable during fishing.

In FIG. 2 the fishing rod (11) and fishing rod butt (14) are shown in position in a fishing rod holder (20). When fishing rod butt (14) is placed into loops (21) and (22) of fishing rod holder (20), pivoting body support (16) is set into position as shown in FIG. 4 of the drawings and inserted down through loops (21) and (22) and then opened into position as shown in FIG. 2. This secures the pole to the boat and prevents the tackle from being lost when the pole is unsupervised.

Figure 3:
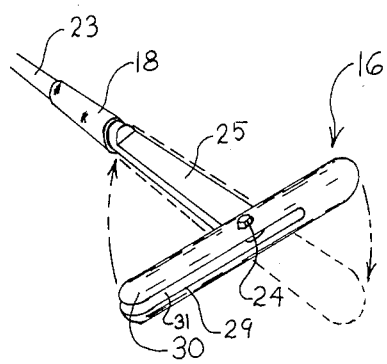
FIG. 3 is a perspective view showing the structure of the fishing rod butt and showing the pivoting action of the pivoting body support with respect to the main butt structure.

In FIG. 3, the construction of main butt structure (23) and its connection to pivoting body support (16) is shown in greater detail. Pivoting body support (16) is provided with slot (31) and extensions (29) and (30).

Main butt structure (23) is milled or formed with flat area as shown to form extension (25). Pivoting body support (16) is attached to the end of extension (25) by pivot pin (24).

FIG. 4 shows pivoting body support (16) in locked position with respect to main butt structure (23). Here pivoting body support (16) is positioned in line with main butt structure (23) and locking sleeve (18) slides down and over pivoting body support (16), thereby locking it in line with main butt structure (23). Sleeve (18) is held in locked position by pin (28).

FIG. 5 of the drawings shows pivoting body support (16) in an open condition with respect to main butt structure (23). Sleeve (18), which is set on main butt structure (23), has slots (26) and (27) provided therein, and pin (28) is provided in main butt structure (23). Sleeve (18) is shown in the locked position, in which pivoting body support (16) is able to pivot minimally, but is prevented from closing as shown in FIG. 4. In the preferred embodiment, the sizing of parts was so chosen that the minimal pivoting allowed was ±15 degrees from the right-angle setting shown in FIG. 5.

FIG. 6 shows an alternative embodiment of the locking mechanism for use in locking the pivoting body support (16) in an open or closed position with respect to main butt structure (23). In this embodiment, extension (25) is slotted with slots (46) and (47), which accept pin (45) to lock the position of pivoting body support (16) with respect to main butt structure (23). Once locked, pin (45) is held in position by spring (44), which is held tightly between pin (45) and the end of hole (48). Rod (43) is rigidly attached to pin (45) at one end, and its other end is threaded (42) into sleeve (41), which is attached to cap (40). Hole (49) is provided and is sized to allow sliding of sleeve (41).

In the assembly of the locking structure of FIG. 6, pin (45) is first attached to rod (43). Sleeve (41) is attached to cap (40), spring (44) is inserted into hole (48), rod (43) with pin (45) attached is inserted into hole (48) and through the center of spring (44), and sleeve (41) with cap (40) attached is inserted into hole (49) and screwed onto rod (43).

In order to adjust the position of pivoting body support (16), the operator pulls out cap (40) as shown in dashed lines, thereby releasing pin (45). Spring (44) forces pin (45) back into slot (46) or (47) when adjustment is complete.

FIGS. 7 and 7A of the drawings show another alternative embodiment of the locking mechanism for use in locking pivoting body support (16) in an open or closed position with respect to main butt structure (23). Slots (50) and (51) are cut in extension (25) as shown in FIG. 7, and lever (52) locks pivoting body support (16) in position when it forces key (65) into slot (50) or (51). Lever (52) sits in cutout area (59) as shown in FIG. 7A and pivots on pin (53). Key (65) is forced into slots (50) and/or (51) by spring pressure created by spring (57) at the other end of lever (52). As shown in FIG. 7A, hole (56) is provided to accept spring (57). Bearing (58) is rigidly attached to spring (57), and the combination of spring (57) and bearing (58) is held in place by set screw (60). The position of pivoting body support (16) is adjusted by depression lever (52) at handle (54).

The foregoing descriptions have disclosed the preferred embodiments of the present invention at this time. However, because improvements and refinements in the design and structure of the present invention will readily occur to those skilled in the art of making fishing rod butts, it is applicant's intent that protection not be limited by any of the disclosure herein, but only by the claims which follow.

I claim:
1. A fishing rod butt, comprising:
a main butt structure constructed of substantially round stock and having a front end and a back end;
means for attaching a fishing rod to said front end of said main butt structure;
a body support, constructed of substantially round stock of substantially the same diameter as that of which said main butt structure is constructed, having a first end and a second end, said body support being pivotally attached to said back end of said main butt structure by pivot means positioned midway between said first end and said second end so that said body support pivots to a position in line with said main butt structure and a position substantially perpendicular to said main butt structure;
positioning means for holding said body support in position with respect to said main butt structure, consisting substantially of:
a substantially cylindrical sleeve having an inner diameter substantially equal to the outer diameter of said main butt structure and of said body support such that said substantially cylindrical sleeve slides laterally on said main butt structure over said body support into a position near said pivot means when said body support is positioned in line with said main butt structure, and into a position near said pivot means when said body support is pivoted to a position substantially perpendicular to said main butt structure, and
locking means for holding said substantially cylindrical sleeve in position when said substantially cylindrical sleeve is slid into a position near said pivot means, whereby the movement of said body support with respect to said main butt structure is limited.

2. A fishing rod butt, comprising:
a main butt structure having a front end and a back end;
means for attaching a fishing rod to said front end of said main butt structure;
a body support, constructed of substantially round stock of substantially the same diameter as that of which the main butt structure is constructed, having a first end and a second end, said body support being pivotally attached to said back end of said main butt structure by pivot means positioned midway between said first end and said second end so that said body support pivots to a position in line with said main butt structure and a position substantially perpendicular to said main butt structure;
locking means for locking said body support with respect to said main butt structure, consisting substantially of:
a spring-loaded locking pin positioned inside said body support so that said pin is adjacent to and rests on said back end of said main butt structure;
receptacle means in said back end of said main butt structure for receiving said spring-loaded locking pin, and
means for releasing said spring-loaded locking pin from said receptacle means.

3. A fishing rod butt, comprising:

a main butt structure having a front end and a back end;

means for attaching a fishing rod to said front end of said main butt structure;

a body support, constructed of substantially round stock of substantially the same diameter as that of which the main butt structure is constructed, having a first end and a second end, said body support being pivotally attached to said back end of said main butt structure by pivot means positioned midway between said first end and said second end so that said body support pivots to a position in line with said main butt structure and a position substantially perpendicular to said main butt structure;

locking means for locking said body support with respect to said main butt structure, consisting substantially of:

a lever pivotally attached to said body support and having a handle end and a key end, said key end being adjacent to and resting on said back end of said body support;

receptacle means in said back end of said main butt structure for receiving said key end of said lever, and spring means acting on said lever whereby contact is maintained between said key end and said back end of said body support except when said handle end is acted upon by external force.

* * * * *